(12) United States Patent
Sugiyama (10) Patent No.: US 11,693,132 B2
(45) Date of Patent: Jul. 4, 2023

(54) SCINTILLATOR ATTACHMENT STRUCTURE IN RADIATION IMAGING UNIT

(71) Applicant: HAMAMATSU PHOTONICS K.K., Hamamatsu (JP)

(72) Inventor: Mototsugu Sugiyama, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 119 days.

(21) Appl. No.: 17/310,819

(22) PCT Filed: Dec. 23, 2019

(86) PCT No.: PCT/JP2019/050418
§ 371 (c)(1),
(2) Date: Aug. 25, 2021

(87) PCT Pub. No.: WO2020/174849
PCT Pub. Date: Sep. 3, 2020

(65) Prior Publication Data
US 2022/0120922 A1 Apr. 21, 2022

(30) Foreign Application Priority Data
Feb. 27, 2019 (JP) .............................. JP2019-034830

(51) Int. Cl.
*G01T 1/20* (2006.01)
(52) U.S. Cl.
CPC ........ *G01T 1/20188* (2020.05); *G01T 1/2002* (2013.01)

(58) Field of Classification Search
CPC .............. G01T 1/20188; G01T 1/2002; G01T 1/20187; G01T 7/08; G01N 23/04; G06T 5/009; G06T 2207/10116
See application file for complete search history.

(56) References Cited

U.S. PATENT DOCUMENTS

| 5,150,394 A | * | 9/1992 | Karellas | A61B 6/505 |
| | | | | 250/580 |
| 5,465,284 A | * | 11/1995 | Karellas | A61B 6/4258 |
| | | | | 250/580 |
| 2002/0070365 A1 | | 6/2002 | Karellas | |

FOREIGN PATENT DOCUMENTS

| EP | 0368369 B1 | 10/1993 |
| JP | S55-086976 U | 6/1980 |
| JP | H11231056 A * | 8/1999 |
| JP | 2001-345578 A | 12/2001 |

(Continued)

OTHER PUBLICATIONS

International Preliminary Report on Patentability dated Sep. 10, 2021 for PCT/JP2019/050418.

*Primary Examiner* — Kiho Kim
(74) *Attorney, Agent, or Firm* — Faegre Drinker Biddle & Reath LLP (57) ABSTRACT

A scintillator attachment structure includes an opening formed in a first side wall portion of a housing and a scintillator holder that holds the scintillator and includes a holder portion fitted in the opening. The scintillator holder can be attached to and detached from the housing. While the scintillator holder is attached to the housing, a predetermined angle is formed between the scintillator held by the holder portion protruding from the first side wall portion into the housing and the front surface mirror in the housing.

7 Claims, 10 Drawing Sheets

(56) References Cited

FOREIGN PATENT DOCUMENTS

| | | |
|---|---|---|
| JP | 2002-365368 A | 12/2002 |
| JP | 2003-152361 A | 5/2003 |
| JP | 2018-072025 A | 5/2018 |
| JP | 2018-136346 A | 8/2018 |
| KR | 101792420 B1 | 11/2017 |
| WO | WO-2017/056680 A1 | 4/2017 |

* cited by examiner

SCINTILLATOR ATTACHMENT STRUCTURE IN RADIATION IMAGING UNIT

TECHNICAL FIELD

The present invention relates to a scintillator attachment structure in a radiation imaging unit.

BACKGROUND ART

There is known a system that irradiates an object with X-rays, causes a scintillator to convert X-rays transmitted through the object into scintillation light, and detects the scintillation light using a detector. The system disclosed in Patent Literature 1 includes an opaque scintillator and captures an image of scintillation light output from the input surface of the scintillator (the surface to which X-rays are input). An embodiment of this system includes a conveying apparatus that conveys an object in the conveying direction and performs image capturing in accordance with the conveying speed of the object by using a line scan camera.

In this system, the scintillator is held by a scintillator holding unit. The scintillator holding unit is accommodated in a housing and fixed in the housing. The scintillator holding unit holds the scintillator while the scintillator is positioned in at least a radiation flux. The scintillator holding unit holds the reverse surface side of the scintillator so as to expose the input surface of the scintillator. The input surface of the scintillator faces both a radiation source and the line scan camera. In addition, this scintillator holding unit is configured to allow replacement of the scintillator to be held.

CITATION LIST

Patent Literature

Patent Literature 1: International Publication No. 2017/056680

SUMMARY OF INVENTION

Technical Problem

In general, a scintillator deteriorates when irradiated with radiation. As the scintillator deteriorates with use, the ability to convert radiation into scintillation light deteriorates. This makes it necessary to replace the deteriorated scintillator. When the scintillator is attached to a radiation imaging unit, the scintillator is almost always fixed in the housing because importance is placed on the position or angle of the scintillator. For this reason, it takes time and effort to take out the scintillator.

The present disclosure describes a scintillator attachment structure that can easily replace the scintillator in a radiation imaging unit.

Solution to Problem

According to one aspect of the present disclosure, there is provided a scintillator attachment structure in a radiation imaging unit including a housing, a scintillator attached in the housing, and a mirror that is attached in the housing and forms a predetermined angle with respect to the scintillator, the scintillator attachment structure including an opening formed in a wall portion of the housing, and a scintillator holder that holds the scintillator and includes a holder portion fitted in the opening, the scintillator holder can be attached to and detached from the housing, wherein, while the scintillator holder is attached to the housing, the predetermined angle is formed between the scintillator held by the holder portion protruding from the wall portion into the housing and the mirror in the housing.

In the scintillator attachment structure in this radiation imaging unit, the holder portion of the scintillator holder holds the scintillator, and a predetermined angle is formed between the scintillator and the mirror while the scintillator holder is attached to the housing. In the radiation imaging unit, the scintillator converts radiation and outputs scintillation light. Installing the mirror at a predetermined angle with respect to this scintillation light causes the camera (detector) installed in, for example, the housing to detect the scintillation light. Accordingly, the angle of the mirror is important. Since a predetermined angle of the mirror with respect to the scintillator is secured, the reliability of this radiation imaging unit as an optical device is secured. In this case, the holder portion of the scintillator holder can be taken in and out of the opening formed in the wall portion of the housing, and the scintillator holder can be attached to and detached from the housing. Accordingly, when the scintillator has deteriorated, etc., the scintillator can be easily replaced by detaching the scintillator holder from the housing.

According to some aspects, the scintillator holder includes a base portion that is contiguous to a proximal end of the holder portion and fixed to the wall portion and can be attached to and detached from the housing by maintaining and releasing a fixed state of the base portion. Since the base portion is fixed to the wall portion, the scintillator holder can be easily attached. When attaching and detaching the scintillator holder, the operator can move the scintillator holder while holding the base portion. This improves the operability.

According to some aspects, concave/convex engaging portions for positioning the base portion are formed on the wall portion and the base portion. Since the concave/convex engaging portions position the base portion with respect to the wall portion, the posture of the scintillator holder is stabilized while the scintillator holder is attached to the housing. In addition, when the scintillator holder is attached to the housing, the concave/convex engaging portions serve as guides for the position of the base portion, and hence the scintillator holder can be easily fitted in the housing.

According to some aspects, the holder portion of the scintillator holder includes a frame portion to which the base portion is contiguous and in which the scintillator is fitted, and a press portion that is fitted in the frame portion to sandwich the scintillator. The operator can set the scintillator on the holder portion by only fitting the press portion in the frame portion while the scintillator is fitted in the frame portion. This facilitates replacement of the scintillator.

According to some aspects, the scintillator attachment structure further includes a mirror holder that is fixed in the housing and holds the mirror, the mirror holder holding the mirror at a position overlapping a normal of a surface of the scintillator installed in the housing. In this case, the mirror holder holds the mirror at a predetermined position. When the mirror is placed at a position overlapping the normal of the surface of the scintillator, the mirror reflects scintillation light output from the surface in the normal direction. For example, detecting this scintillation light with the camera (detector) installed in the housing implements radiation image capturing based on the so-called front surface observation scheme. In addition, no tilt distortion (perspective distortion) occurs in a radiation image. This prevents the radiation image from blurring.

According to some aspects, an inserting direction of the scintillator holder with respect to the opening is parallel to the surface of the scintillator. In this case, the scintillator holder is inserted into the opening by horizontal sliding movement of the scintillator. Since it is unnecessary to move the scintillator holder vertically, the scintillator can be easily installed at a desired height.

According to some aspects, a slit for passing radiation is formed in a second wall portion perpendicular to the wall portion of the housing, and the mirror is positioned outside an irradiation region of radiation which connects a peripheral edge of the slit and the surface of the scintillator installed in the housing. Since the mirror is positioned outside the irradiation region of radiation, the radiation transmitted through the object is input to the surface of the scintillator without passing through the mirror. This eliminates the influence of the mirror on radiation. As a result, the radiation imaging unit can acquire a radiation image of the object with clarity and high sensitivity.

Advantageous Effects of Invention

According to some aspects of the present disclosure, it is possible to easily replace a scintillator by detaching a scintillator holder from a housing.

DESCRIPTION OF EMBODIMENTS

Hereinafter, embodiments of the present disclosure will be described below with reference to the accompanying drawings. Note that the same reference signs denote the same elements in the description of the drawings, and any overlapping description will be omitted. Also, the respective drawings are prepared for the purpose of description, and are drawn so that the portions to be described are especially emphasized. Therefore, the dimensional ratios of respective members in the drawings are not always coincident with actual ratios.

Figure 1:
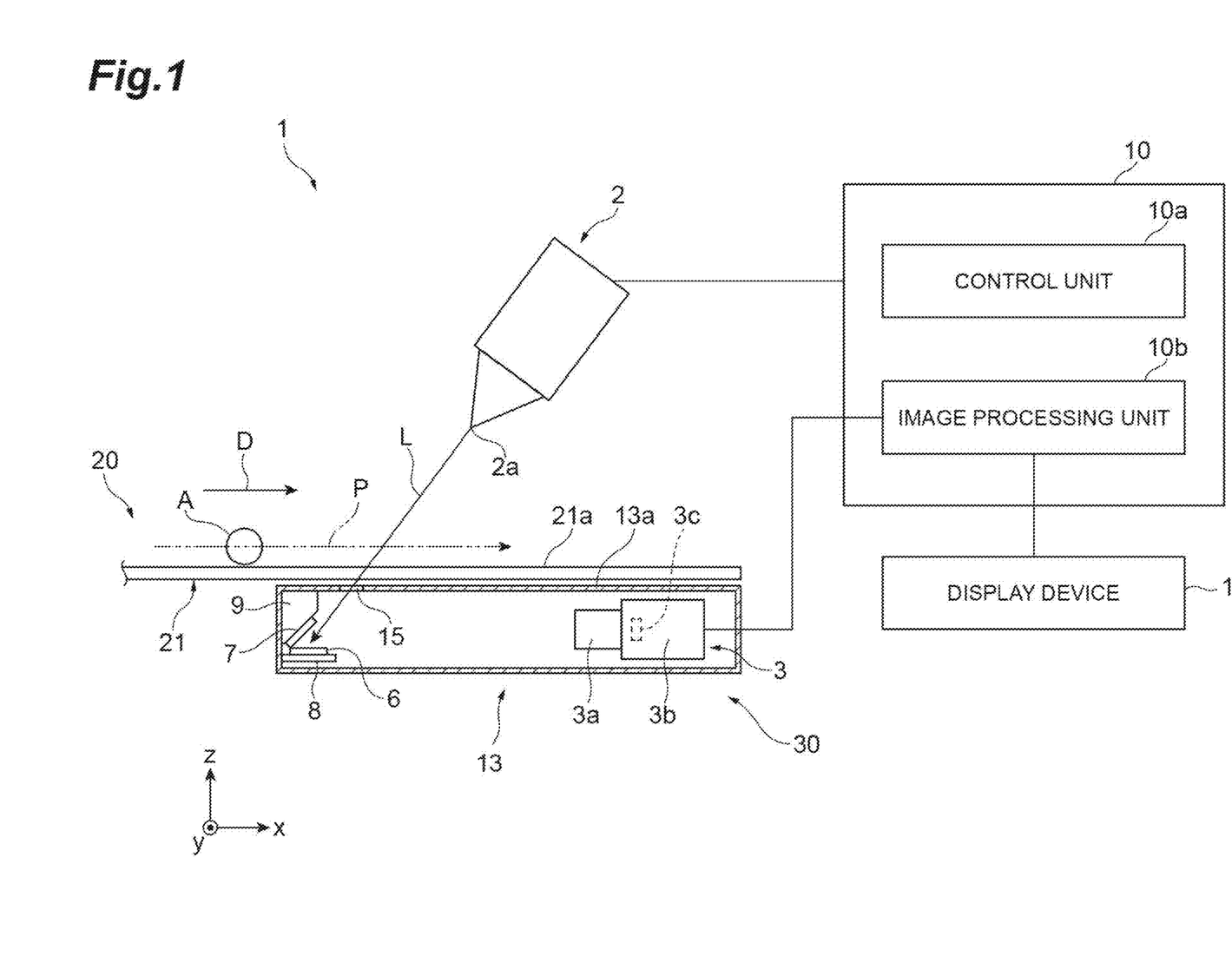
FIG. 1 is a view showing a radiation image acquisition system to which a scintillator attachment structure according to the first embodiment of the present disclosure is applied.

As shown in FIG. 1, a radiation image acquisition system 1 to which the first embodiment of the present disclosure is applied is an apparatus for acquiring a radiation image of an object A. The object A contains, for example, a material composed of a light element. The radiation image acquisition system 1 is applied to, for example, fields such as food inspection and battery inspection. In the field of food inspection, for example, the presence or absence of foreign matter getting caught is inspected. The radiation image acquisition system 1 is particularly excellent in performance for distinguishing a material composed of a light element by having a unique configuration to be described later. The radiation image acquisition system 1 is applied to, for example, inline X-ray inspection.

The radiation image acquisition system 1 includes a radiation source 2 that outputs radiation such as white X-rays toward the object A, a conveying apparatus 20 that conveys the object A in a predetermined conveying direction D, a scintillator 6 that generates scintillation light in accordance with the input of radiation transmitted through the object A conveyed by the conveying apparatus 20, a line scan camera 3 that detects scintillation light output from a radiation input surface (obverse surface) 6a of the scintillator 6, and a computer 10 that controls several functions of the radiation image acquisition system 1 and generates a radiation image. As described above, the radiation image acquisition system 1 is an X-ray photographing system based on a scintillator obverse surface observation scheme. The radiation image acquisition system 1 is excellent in low-energy X-ray sensitivity.

The radiation source 2 outputs cone beam X-rays from an X-ray emission portion. The radiation source 2 has a focus 2a of cone beam X-rays. The X-rays emitted from the radiation source 2 form a radiation flux. In the radiation image acquisition system 1, X-rays in an irradiation region 12 which are part of the X-rays forming the radiation flux are input to the input surface 6a of the scintillator 6. The irradiation region 12 includes a central axis L positioned in the center of the irradiation region 12.

The conveying apparatus 20 includes a belt conveyor 21 that moves along, for example, an orbital path. The object A is placed or held on a conveying surface 21a of the belt conveyor 21. The conveying apparatus 20 is configured to convey the object A in the conveying direction D at a constant speed. In other words, the conveying apparatus 20 conveys the object A on a predetermined conveying path P. A conveying timing and a conveying speed are set in advance for the object A in the conveying apparatus 20, and are controlled by a control unit 10a of the computer 10.

The radiation image acquisition system 1 includes an imaging unit (radiation imaging unit) 30 installed along the conveying apparatus 20. The imaging unit 30 is attached to, for example, the conveying apparatus 20 and fixed to the conveying apparatus 20. The imaging unit 30 is attached so as not to interfere with the circular motion of the belt conveyor 21. The imaging unit 30 is placed with some gap from a conveying unit such as a belt conveyor so as not to interfere with the movement of the conveying unit.

Figure 2:
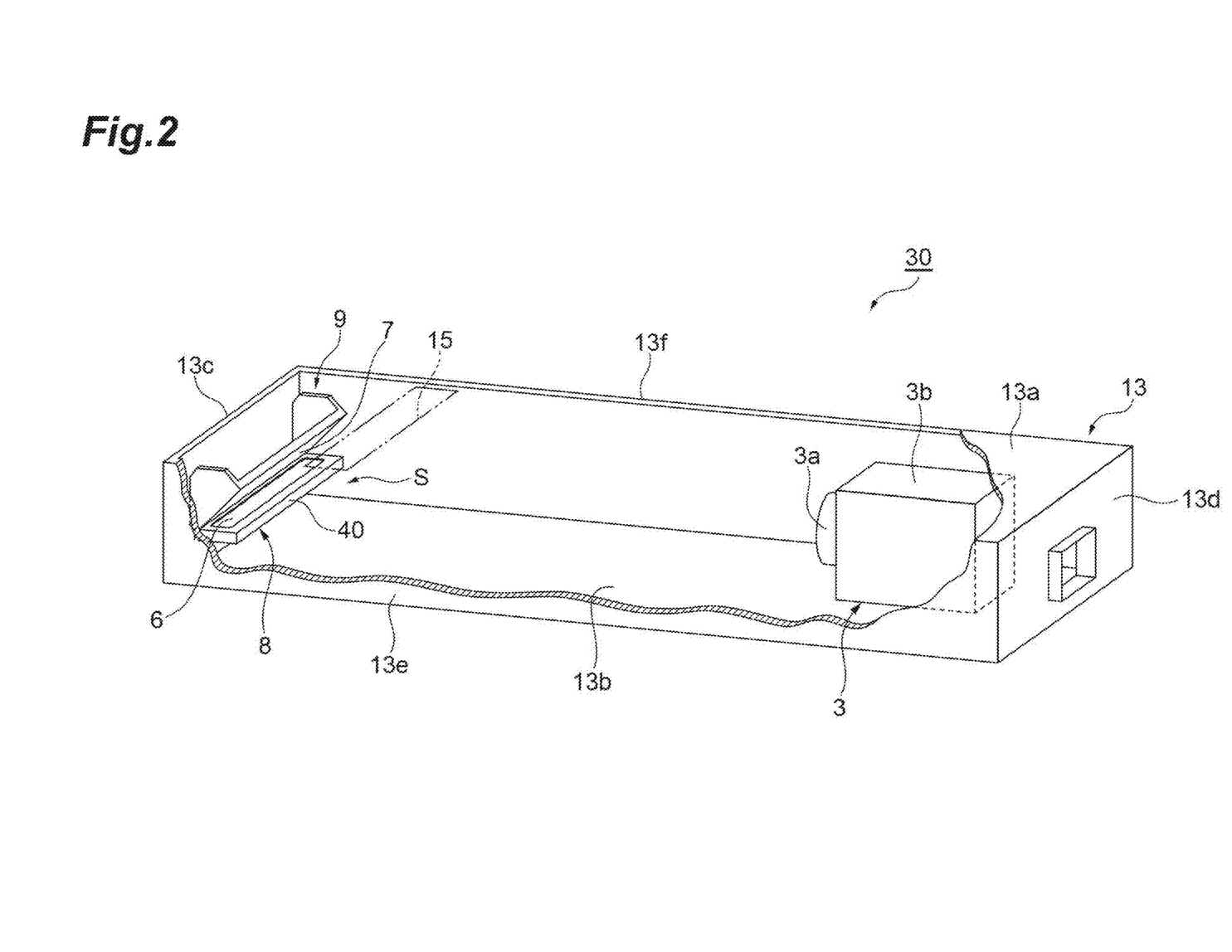
FIG. 2 is a perspective view showing a radiation imaging unit in FIG. 1, together with a cutaway view of a housing.

As shown in FIGS. 1 and 2, the imaging unit 30 has a housing 13 having a rectangular parallelepiped shape. The housing 13 is made of, for example, a material that can block X-rays. The housing 13 is a so-called dark box. The housing 13 may be made of, for example, aluminum or iron. The housing 13 may include a protective material. Lead may be used as this protective material. The housing 13 has a shape longer in the conveying direction D. The housing 13 includes an upper wall portion (second wall portion) 13a and a bottom wall portion 13b which face vertically, a first side wall portion (wall portion) 13c and a second side wall portion 13d which face in the conveying direction D, and a third side wall portion 13e and a fourth side wall portion 13f which face in a horizontal detection width direction perpendicular to the conveying direction D. With the first side wall portion 13c and the second side wall portion 13d of the housing 13 being very small, the imaging unit 30 is a compact device placed along the conveying apparatus 20. The conveying direction D is parallel to the x direction parallel to the drawing surface in the figure. The above detection width direction is parallel to the y direction perpendicular to the drawing surface in the figure. The up/down direction is parallel to the z direction parallel to the drawing surface in the figure.

The upper wall portion (wall portion) 13a is placed to face the conveying path P of the conveying apparatus 20. In other words, of the six wall portions of the housing 13, the upper wall portion 13a is closest to the conveying apparatus 20. The upper wall portion 13a may be attached to the conveying apparatus 20.

The imaging unit 30 is configured to capture an image of scintillation light output from the input surface 6a of the scintillator 6 in the normal B direction of the input surface 6a. Accordingly, the imaging unit 30 includes a surface mirror (mirror) 7 that reflects scintillation light output in the normal B direction of the input surface 6a. The front surface mirror 7 is placed at a position overlapping the normal B of the input surface 6a, with a reflecting surface 7a of the front surface mirror 7 obliquely facing the input surface 6a.

The scintillator 6, the front surface mirror 7, and the line scan camera 3 are installed in the housing 13. The scintillator 6, the front surface mirror 7, and the line scan camera 3 are fixed in the housing 13. The scintillator 6, the front surface mirror 7, and the line scan camera 3 are optically coupled to each other. The scintillator 6 and the front surface mirror 7 are placed near the first side wall portion 13c. The line scan camera 3 is placed near the second side wall portion 13d. The scintillator 6 is held by, for example, a scintillator holder 8 and placed, for example, horizontally. The front surface mirror 7 is held by, for example, a mirror holder 9 and placed to be tilted with respect to the horizontal direction.

The scintillator 6 is a flat wavelength conversion member. The scintillator 6 has a rectangular shape longer in the detection width direction (y direction) (see FIG. 5). The scintillator 6 is made of, for example, $Gd_2O_2S:Tb$, $Gd_2O_2S:Pr$, CsI:Tl, $CdWO_4$, $CaWO_4$, $Gd_2SiO_5:Ce$, $Lu_{0.4}Gd_{1.6}SiO_5$, $Bi_4Ge_3O_{12}$, $Lu_2SiO_5:Ce$, $Y_2SiO_5$, $YAlO_3:Ce$, $Y_2O_2S:Tb$, $YTaO_4:Tm$, YAG:Ce, YAG:Pr, YGAG:Ce, YGAG:Pr, GAGG:Ce, or the like. Note that the scintillator 6 may be formed from one scintillator or formed by bonding two scintillators, etc. When two scintillators are to be bonded to each other, a plate or film having the property of blocking or reflecting light may be sandwiched between the two scintillators. The two scintillators may be of the same type or different types.

The front surface mirror 7 is, for example, an aluminum-deposited glass or a mirror made of a mirror-finished metal. The front surface mirror 7 has a rectangular shape longer in the detection width direction (y direction). The front surface mirror 7 has the reflecting surface 7a having an area sufficiently large to reflect scintillation light output from the input surface 6a in the normal B direction. The front surface mirror 7 has a predetermined angle θ formed between the reflecting surface 7a and the input surface 6a of the scintillator 6. In this case, the fact that the front surface mirror 7 has an angle with respect to the input surface 6a does not mean that the front surface mirror 7 is placed near the scintillator 6. The front surface mirror 7 may be placed near, or away from the scintillator 6. When the front surface mirror 7 is placed away from the scintillator 6, an angle is defined by an extended surface of the reflecting surface 7a and an extended surface of the input surface 6a. The front surface mirror 7 reflects scintillation light output in the normal B direction of the input surface 6a.

The angle θ is an acute angle. The angle θ is preferably an angle within the range of 40° or more to 50° or less. The angle θ is more preferably 45°. The angle θ may be determined based on the placement of the radiation source 2 or the position of a slit 15 (to be described later). The placement of the line scan camera 3 may be adjusted as appropriate depending on the magnitude of the angle θ. Another or a plurality of mirrors may further be installed depending on the magnitude of the angle θ.

The line scan camera 3 performs image capturing in accordance with the movement of the object A. The line scan camera 3 is a lens coupling type detector including a lens portion 3a that condenses scintillation light output from the input surface 6a of the scintillator 6 and a sensor portion 3b that detects the scintillation light condensed by the lens portion 3a. The lens portion 3a includes one lens. This lens is focused on the input surface 6a of the scintillator 6. The sensor portion 3b includes an image sensor 3c. The image sensor 3c is, for example, an area image sensor that can perform TDI (time delay integration) driving. The image sensor 3c is, for example, a CCD area image sensor.

The image sensor 3c is configured such that a plurality of element rows each having a plurality of CCDs arranged in series in the pixel direction are arranged in the integration direction in accordance with the moving direction of the object A. The line scan camera 3 has a scan direction corresponding to the conveying direction D of the object A and a line direction orthogonal to the scan direction. This scan direction is the above integration direction, which is parallel to the z direction in the figure. The line direction is the above pixel direction, which is parallel to the y direction in the figure. The scan direction is a direction converted from the conveying direction D through the front surface mirror 7.

When the angle θ between the reflecting surface 7a of the front surface mirror 7 and the input surface 6a of the scintillator 6 is 45°, the optical axis of the lens portion 3a of the line scan camera 3 is parallel to, for example, the conveying direction D. The line scan camera 3 detects scintillation light output in the normal B direction (see FIG. 9(a)) of the input surface 6a.

The scintillator 6 is placed such that the input surface 6a is parallel to both the conveying direction D and the above line direction. That is, the input surface 6a of the scintillator 6 is parallel to an x-y plane.

Figure 9:
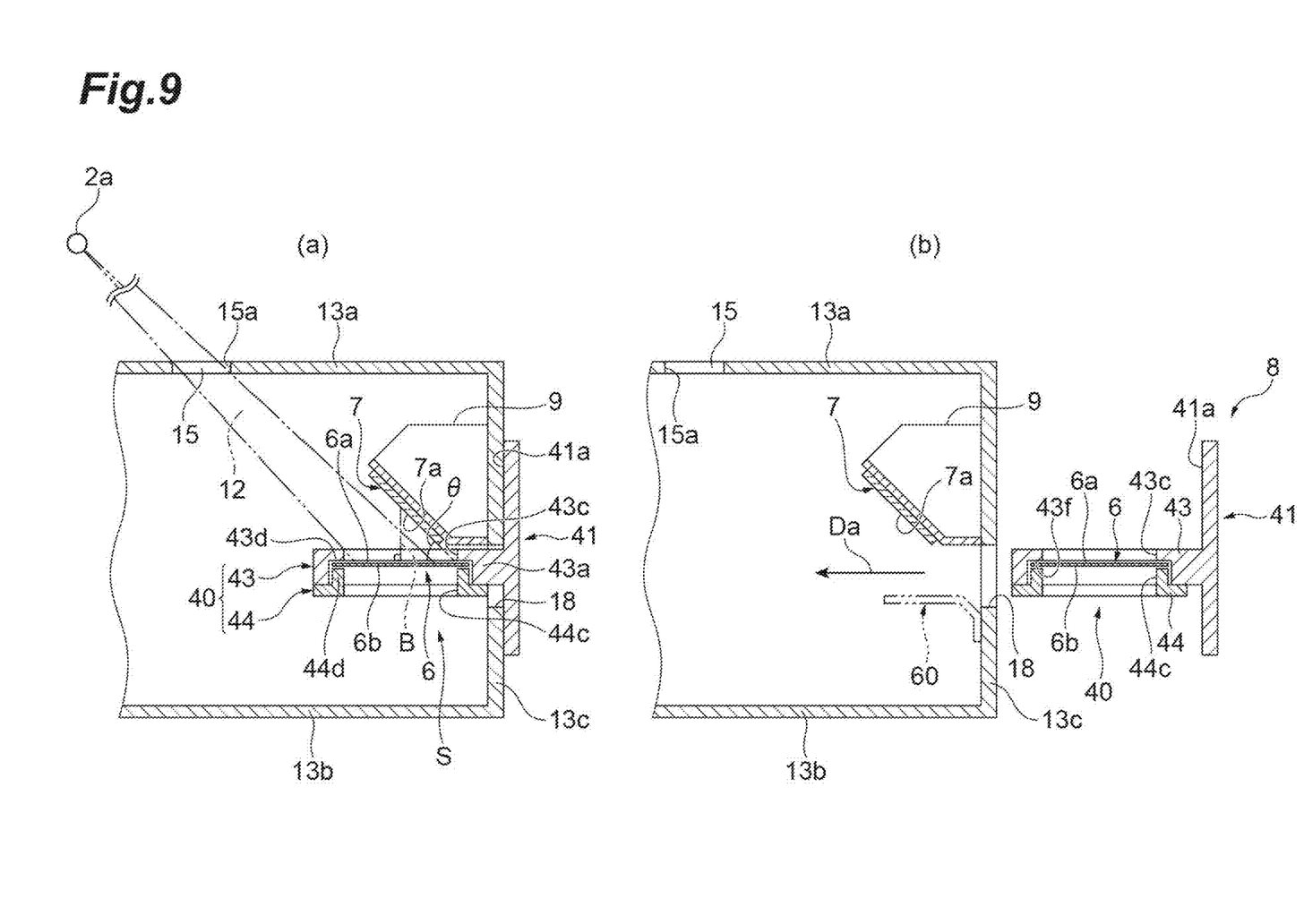
FIG. 9(a) is a sectional view showing a state in which the scintillator holder is attached to the housing.
FIG. 9(b) is a sectional view showing a state in which the scintillator holder is detached from the housing.

As shown in FIGS. 1 and 9(a), the slit 15 for passing X-rays output from the radiation source 2 is formed in the upper wall portion 13a of the housing 13. The slit 15 has a rectangular shape longer in the detection width direction (y direction). The slit 15 includes a peripheral edge 15a of the rectangular shape. X-rays in the irradiation region 12, which have passed through the slit 15, are input to the input surface 6a of the scintillator 6.

The slit 15 and the irradiation region 12 will be described in more detail below. The irradiation region 12 is defined as a region (quadrangular pyramid region) linearly connecting the peripheral edge 15a of the slit 15 to the input surface 6a of the scintillator 6. In other words, the irradiation region 12 is defined as a region linearly connecting the focus 2a of the radiation source 2 to the input surface 6a of the scintillator 6. In this case, "the input surface 6a of the scintillator 6" means only a region effective in outputting scintillation light. Of the entire rectangular input surface 6a, for example, a region covered with the scintillator holder 8 is not included in "the input surface 6a of the scintillator 6" when the irradiation region 12 is defined.

As shown in FIG. 2, the slit 15 is positioned between the scintillator 6, the front surface mirror 7, and the line scan camera 3 in the conveying direction D. The slit 15 is positioned downstream of the scintillator 6 in the conveying direction D. As shown in FIG. 9(a), the front surface mirror 7 is positioned outside the irradiation region 12 of X-rays. In other words, the front surface mirror 7 is installed in a position and a posture (including a tilt) so as not to interfere with the irradiation region 12. The front surface mirror 7 is placed to be tilted with respect to the normal B of the input surface 6a such that the reflecting surface 7a is located along the boundary surface of the irradiation region 12. The scintillation light condensed by the lens portion 3a of the line scan camera 3 crosses the irradiation region 12 in the z direction (the normal B direction of the input surface 6a) and then crosses the irradiation region 12 in the x direction (conveying direction D).

Referring back to FIG. 1, the computer 10 includes, for example, a CPU (Central Processing Unit), ROM (Read Only Memory), RAM (Random Access Memory), and input/output interface. The computer 10 includes the control unit 10a (control processor) that controls the radiation source 2 and the line scan camera 3 and an image processing unit 10b (image processor) that generates a radiation image of the object A based on the radiation image data output from the line scan camera 3. Note that the computer 10 may be formed from a microcomputer, FPGA (Field-Programmable Gate Array), etc.

In the radiation image acquisition system 1 and the imaging unit 30, the radiation source 2 irradiates the object A conveyed by the conveying apparatus 20 with radiation. The radiation transmitted through the object A passes through the slit 15 formed in the upper wall portion 13a of the housing 13. The scintillator 6, the front surface mirror 7, and the line scan camera 3 are attached in the housing 13, and devices necessary for image capturing are formed into a unit. The radiation that has entered the housing 13 is input to the input surface 6a of the scintillator 6. Scintillation light is then output from the input surface 6a. In a region near the input surface 6a of the scintillator 6, radiation with relatively low energy is converted. Accordingly, the line scan camera 3 can acquire a radiation image having excellent low-energy radiation sensitivity. This provides a beneficial effect for the detection of, for example, a material made of a light element included in an object A. Since the input surface 6a of the scintillator 6 is parallel to both the conveying direction D and the line direction of the line scan camera 3, no magnification rate change occurs at different portions in the object A (for example, at the upstream end and the downstream end in the conveying direction D). In addition, since the front surface mirror 7 is positioned outside the irradiation region 12 of radiation, radiation transmitted through the object A is input to the input surface 6a of the scintillator 6 without passing through the front surface mirror 7. This eliminates the influence of the front surface mirror 7 on radiation. That is, it is possible to detect scintillation light output from the input surface 6a of the scintillator 6 without the influence of the front surface mirror 7. This allows the radiation image acquisition system 1 and the imaging unit 30 to acquire a radiation image of the object with clarity and high sensitivity. In addition, the radiation image acquisition system 1 can acquire radiation images at higher speed. Furthermore, the system can acquire radiation images with high S/N ratios.

Figure 3:
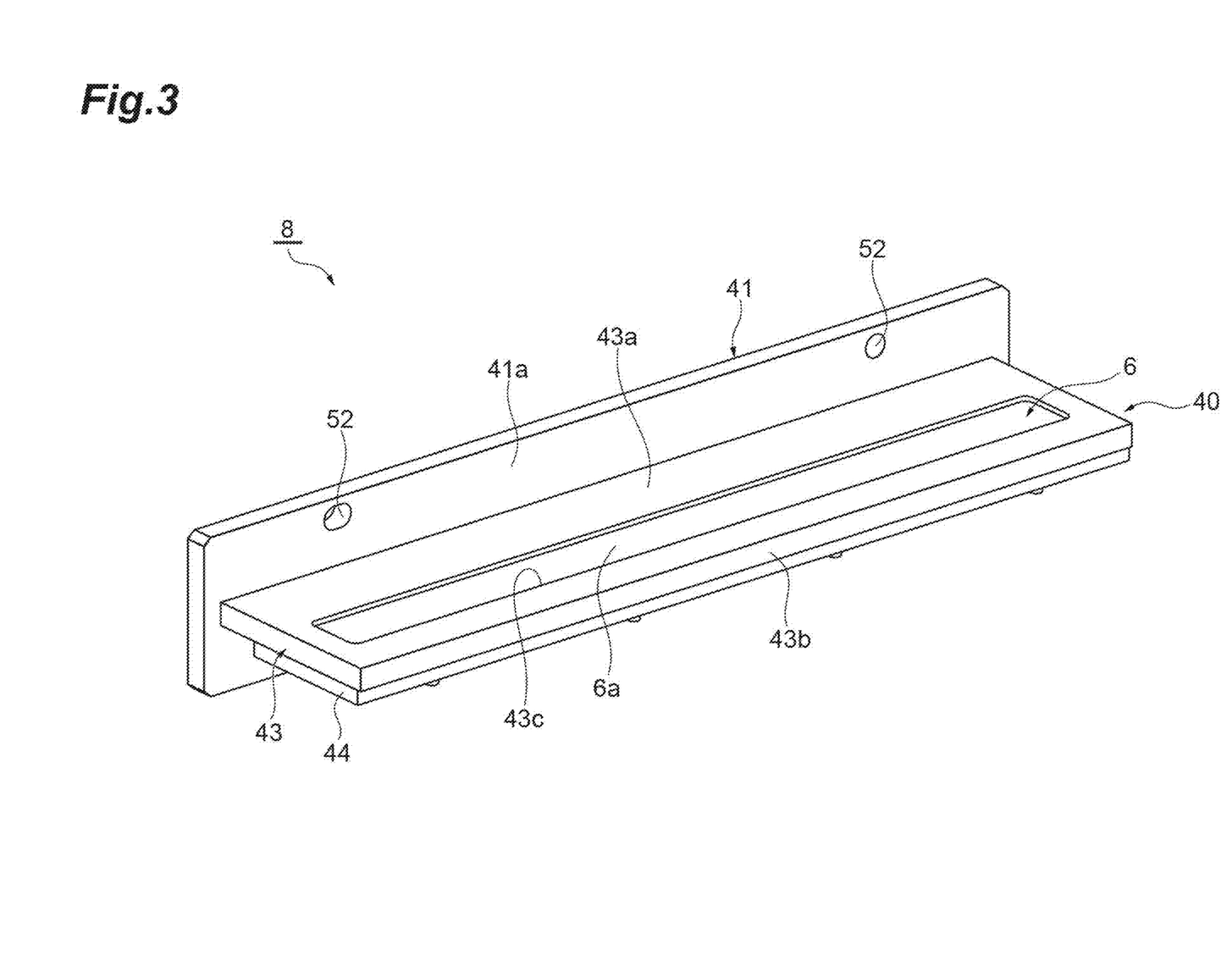
FIG. 3 is a perspective view showing a scintillator holder when viewed from above a holder portion.
Figure 4:
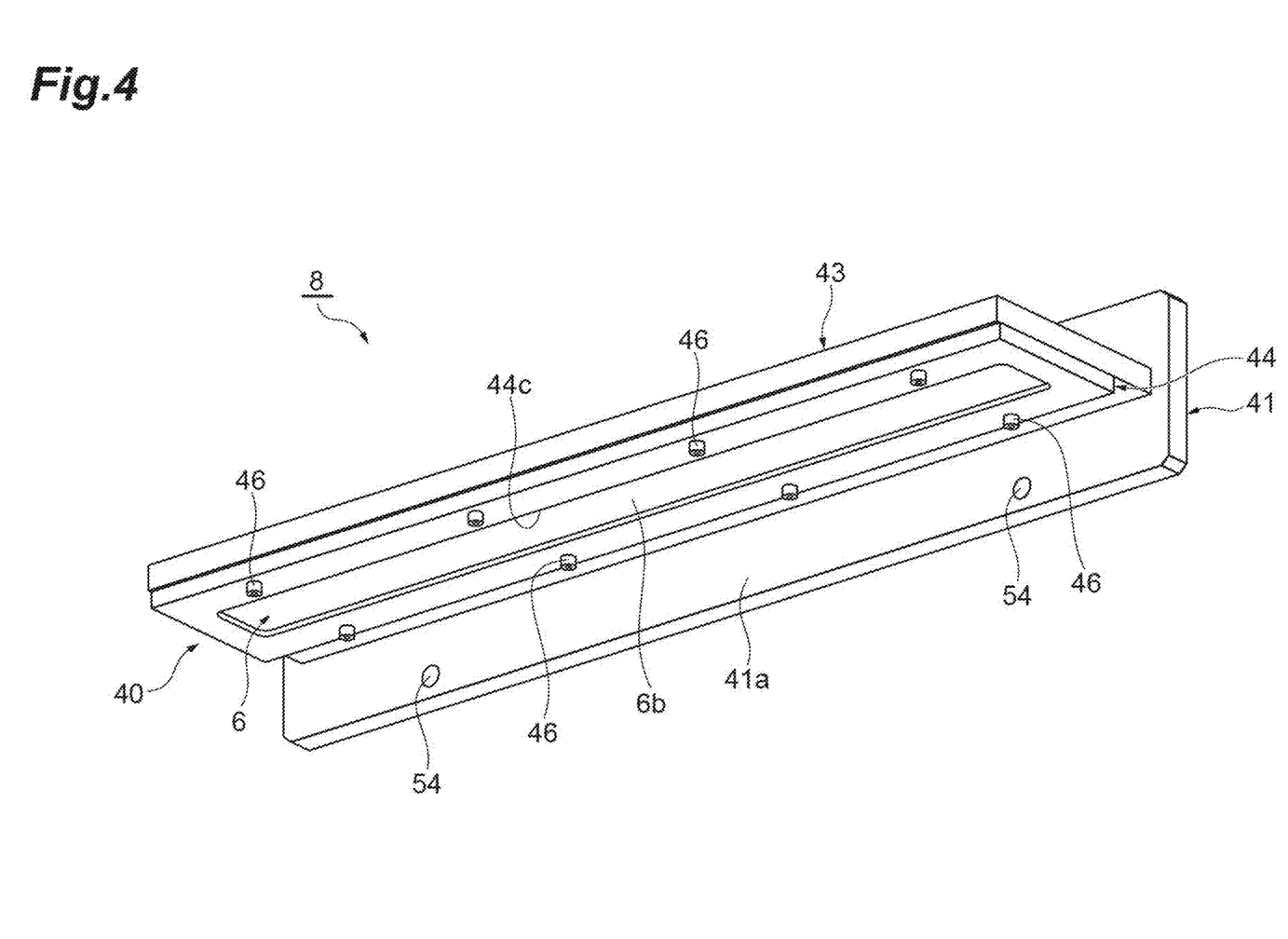
FIG. 4 is a perspective view showing the scintillator holder when viewed from below the holder portion.

Next, an attachment structure S for the scintillator 6 in the imaging unit 30 will be described in detail. The attachment structure S for the scintillator 6 includes a rectangular opening 18 (see FIG. 8) formed in the first side wall portion 13c of the housing 13 and the scintillator holder 8 that holds the scintillator 6. As shown in FIGS. 3 and 4, the scintillator holder 8 has a holder portion 40 that holds the scintillator 6 and is fitted in the opening 18 and a base portion 41 that is contiguous to a proximal end 43a of the holder portion 40 and fixed to the first side wall portion 13c of the housing 13. The holder portion 40 having a substantially plate-like shape protrudes along the x-y plane shown in FIG. 1. The base portion 41 extends along the y-z plane and is orthogonal to the holder portion 40.

Figure 8:
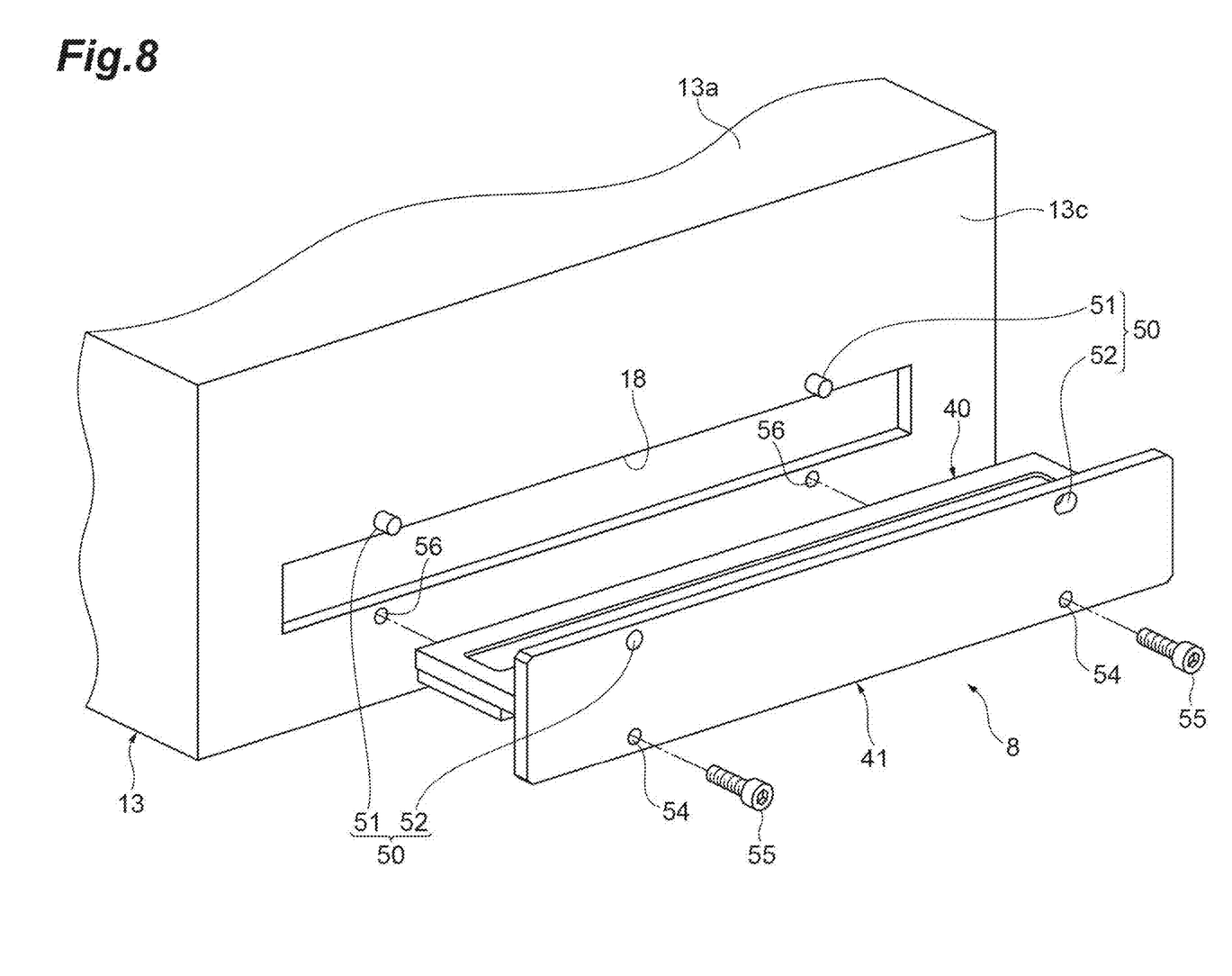
FIG. 8 is a perspective view showing how the scintillator holder is attached to the wall portion and the opening of the housing.

As shown in FIG. 8, the scintillator holder 8 is attached to the housing 13 by screwing fixation screws 55 into screw holes 56 formed in the first side wall portion 13c and through holes 54 formed in the base portion 41. Maintaining the fixed state of the base portion 41 makes it possible to attach and fix the scintillator holder 8 to the housing 13. Releasing the fixed state of the base portion 41 makes it possible to detach the scintillator holder 8 from the housing 13. In other words, the scintillator holder 8 is detachably attached to the housing 13.

The scintillator holder 8 will be described in more detail with reference to FIGS. 3 to 7. The holder portion 40 includes a frame portion 43 contiguous to the base portion 41 and a press portion 44 that is fitted in the frame portion 43. For example, the frame portion 43 and the base portion 41 are integrally molded. A plate-like frame portion protrudes (vertically) from the plate-like base portion 41 in the form of the letter "T". The press portion 44 is discrete from the base portion 41 and the frame portion 43. The base portion 41, the frame portion 43, and the press portion 44 are molded from, for example, aluminum or iron. Note that the base portion 41 and the frame portion 43 are discretely molded, and the frame portion 43 may be fixed to the base portion 41 with fastening members such as bolts.

Figure 5:
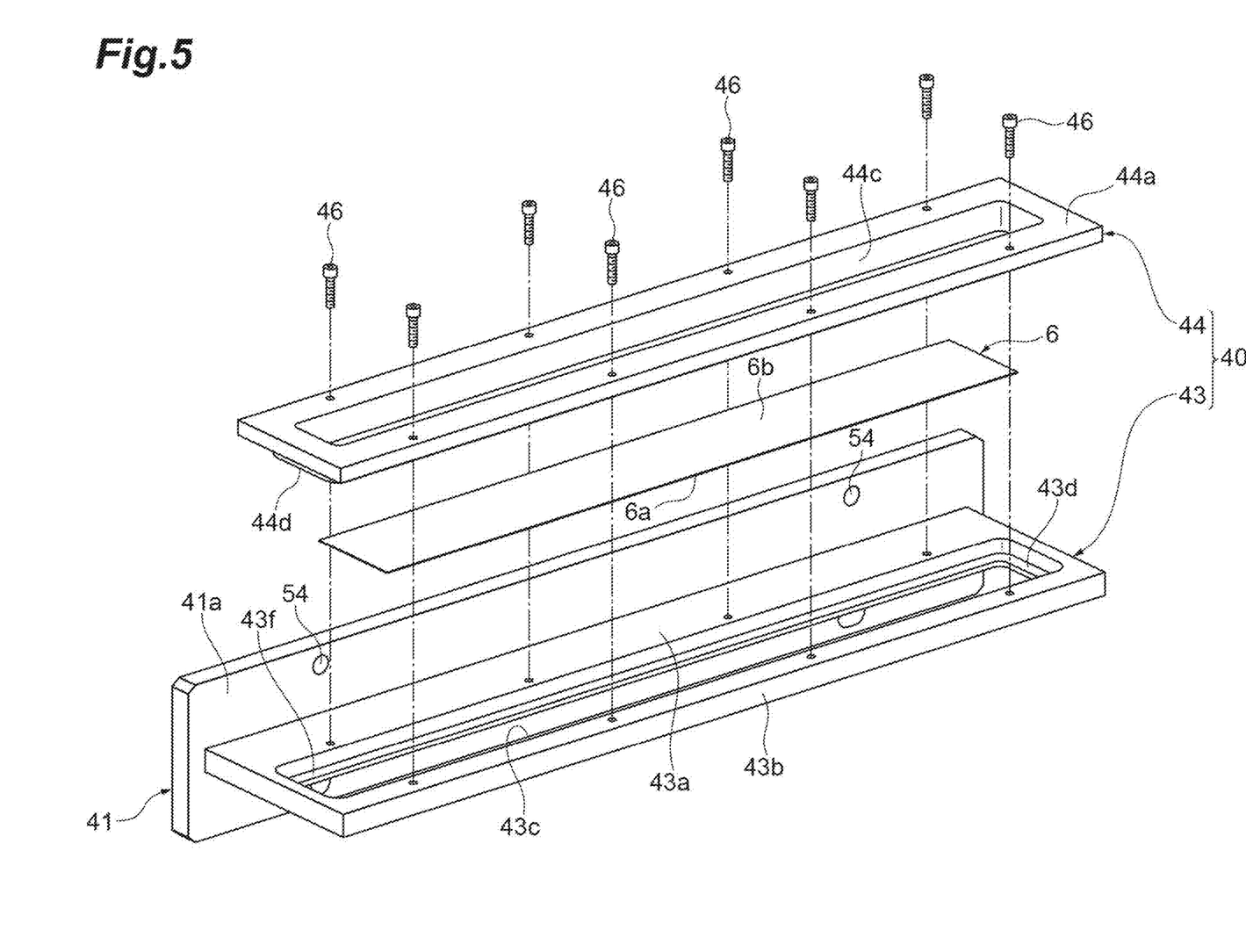
FIG. 5 is an exploded perspective view of the scintillator holder.

The exploded perspective view of FIG. 5 shows the holder portion 40 upside down. As shown in FIG. 5, the press portion 44 includes a rectangular protruding portion 44d smaller by one size than a base portion 44a having a rectangular plate-like shape. An elongated rectangular back window portion 44c is formed to extend through the entire thickness of the press portion 44 (the base portion 44a and the protruding portion 44d). A recess portion 43d in which the protruding portion 44d of the press portion 44 is fitted is formed in the frame portion 43. A front window portion 43c having an elongated rectangular shape and extending through the entire thickness of the frame portion 43 is also formed in the frame portion 43.

The frame portion 43 is configured such that the scintillator 6 is fitted in the recess portion 43d. The size of the recess portion 43d is slightly larger than the outer shape of the scintillator 6, and the peripheral edge portion of the scintillator 6 fitted in the recess portion 43d is in contact with a frame-like stepped portion 43f (see also FIG. 9(b)). When the protruding portion 44d of the press portion 44 is fitted in the recess portion 43d of the frame portion 43, the peripheral edge portion of the scintillator 6 is sandwiched between the distal end face of the protruding portion 44d and the stepped portion 43f. The press portion 44 is fixed to the frame portion 43 by screwing screws 46 into a plurality of screw holes formed in the proximal end 43a and a distal end 43b of the frame portion 43 and a plurality of screw holes formed in the base portion 44a of the press portion 44. At the same time, the scintillator 6 is held in the holder portion 40.

Figure 6:
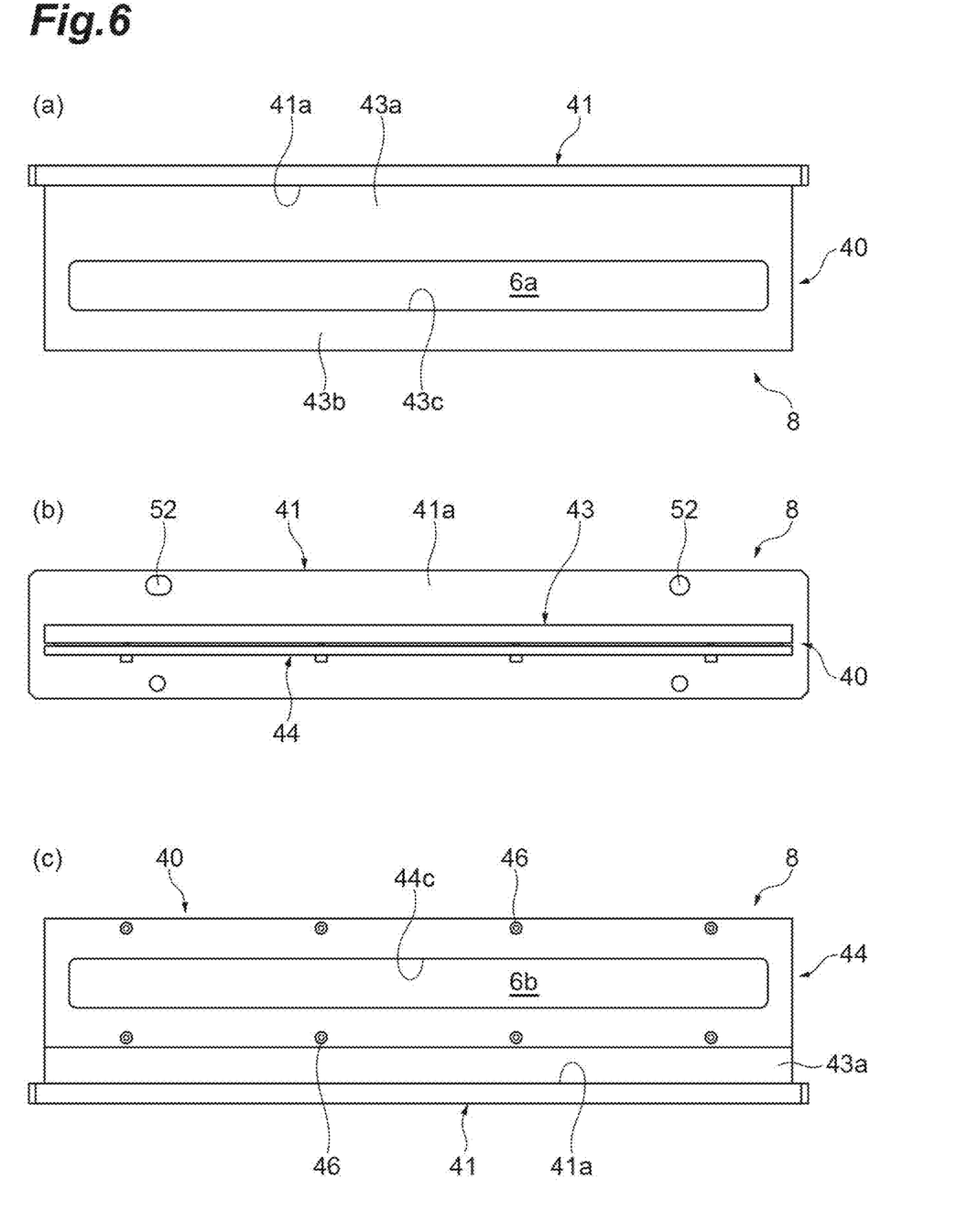
FIGS. 6(a), 6(b), and 6(c) are respectively a plan view, a front view, and a bottom view of the scintillator holder.
Figure 7:
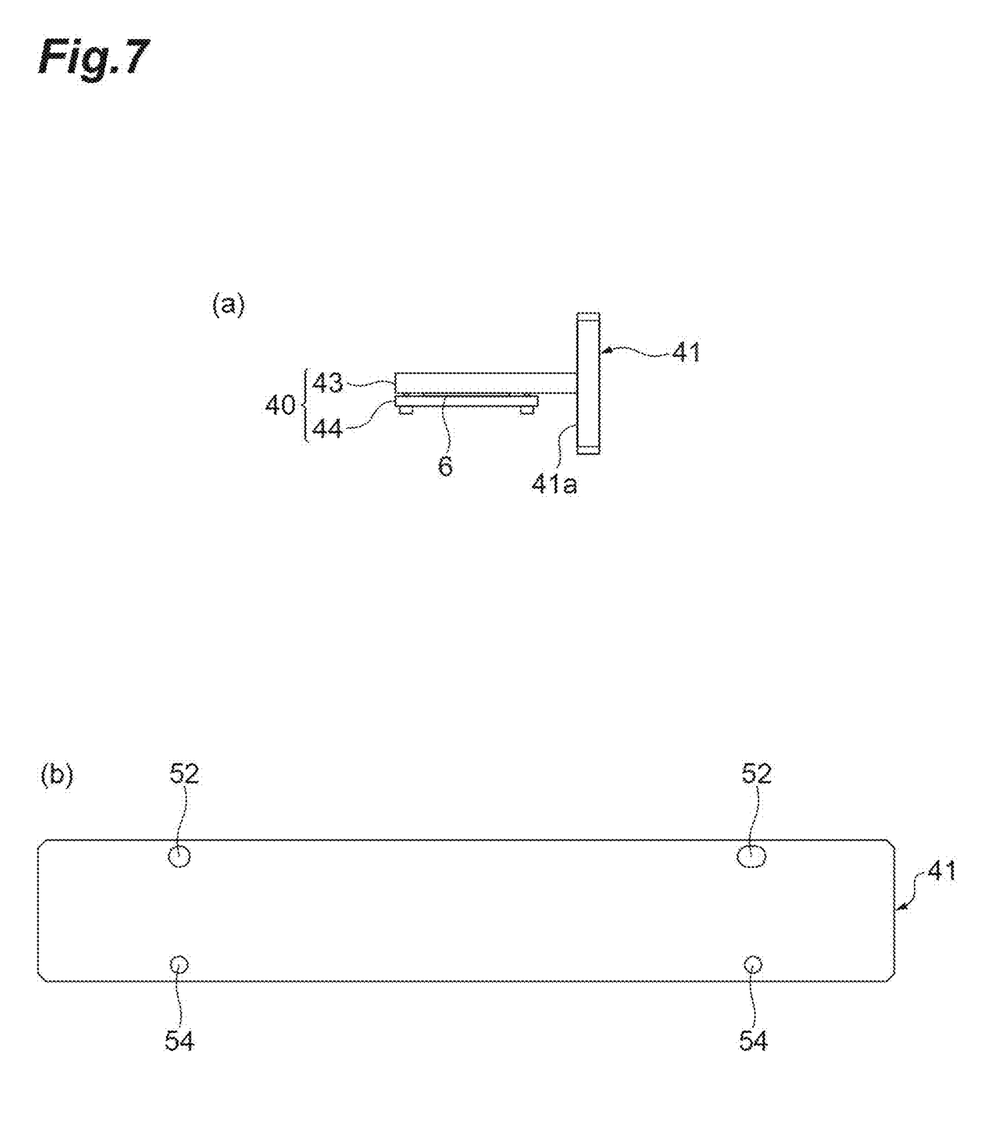
FIGS. 7(a) and 7(b) are respectively a right-side view and a rear view of the scintillator holder.

When the frame portion 43 and the press portion 44 are fitted to each other without the scintillator 6 being sandwiched between them, the front window portion 43c and the back window portion 44c communicate with each other in a substantially overlapping state. While the scintillator 6 is sandwiched between the frame portion 43 and the press portion 44, the input surface 6a of the scintillator 6 is exposed upward (to the front surface mirror 7), and a reverse surface 6b of the scintillator 6 is exposed downward, as shown in FIGS. 6(a), 6(c), and 9(b). Although FIGS. 6 and 7 show six views of the scintillator holder 8, the left-side view of the scintillator holder 8 is symmetrical to the right-side view shown in FIG. 7(a), and hence its illustration is omitted.

As shown in FIGS. 3, 4, and 8, a pair of engaging projections 51 are formed on the first side wall portion 13c of the housing 13 above the opening 18. On the other hand, a pair of engaging holes 52 are formed in the base portion 41 of the scintillator holder 8. When the scintillator holder 8 is fitted in the opening 18, the scintillator holder 8 is positioned so that the engaging projections 51 are inserted (engaged) into (with) the engaging holes 52. That is, the engaging projections 51 and the engaging holes 52 are concave/convex engaging portions 50 for positioning the base portion 41.

An inserting direction Da (see FIG. 9(b)) of the scintillator holder 8 with respect to the opening 18 is parallel to the input surface 6a of the scintillator 6.

As shown in FIG. 9(a), while the scintillator holder 8 is attached to the housing 13, the predetermined angle θ is formed between the scintillator 6 held on the holder portion 40 protruding from the first side wall portion 13c into the housing 13 and the front surface mirror 7 in the housing 13. The mirror holder 9 that holds the front surface mirror 7 is fixed to the first side wall portion 13c (see also FIG. 2). The mirror holder 9 holds the front surface mirror 7 at a position overlapping the normal B of the input surface 6a of the scintillator 6 installed in the housing 13. This causes the scintillation light output from the input surface 6a in the normal B direction of the input surface 6a to propagate parallel to the conveying direction D horizontally. The line scan camera 3 detects this scintillation light.

In the attachment structure S for the scintillator 6 in the imaging unit 30, the holder portion 40 of the scintillator holder 8 holds the scintillator 6. While the scintillator holder 8 is attached to the housing 13, the predetermined angle θ (for example, 45°) is formed between the scintillator 6 and the front surface mirror 7. In the imaging unit 30, the scintillator 6 converts radiation and outputs scintillation light. The front surface mirror 7 is installed at the predetermined angle θ with respect to this scintillation light, so that the scintillation light is detected by the line scan camera 3 installed in the housing 13. Accordingly, the angle of the front surface mirror 7 is important. Since the front surface mirror 7 is secured at the predetermined angle θ with respect to the scintillator 6, the reliability of the imaging unit 30 as an optical device is secured. In this case, the holder portion 40 of the scintillator holder 8 can be taken in and out through the opening 18 formed in the first side wall portion 13c of the housing 13, and the scintillator holder 8 can be attached to and detached from the housing 13. Accordingly, when the scintillator 6 has deteriorated, etc., the scintillator 6 can be easily replaced by detaching the scintillator holder 8 from the housing 13. The necessity to replace the scintillator 6 can occur other than when the scintillator 6 has deteriorated. The attachment structure S allows easy replacement of the scintillator 6 at any time.

Since the base portion 41 is fixed to the first side wall portion 13c, the attachment of the scintillator holder 8 is facilitated. When attaching or detaching the scintillator holder 8, the operator can move the scintillator holder 8 while holding the base portion 41. This improves the operability. Since an abutment surface 41a of the base portion 41 abuts against the first side wall portion 13c, the abutment surface 41a serves as a seating surface to improve the stability.

Since the concave/convex engaging portions 50 position the base portion 41 with respect to the first side wall portion 13c, the posture of the scintillator holder 8 is stabilized while the scintillator holder 8 is attached to the housing 13. In addition, when the scintillator holder 8 is attached to the housing 13, the concave/convex engaging portions 50 serve as guides for the position of the base portion 41, and hence the scintillator holder 8 can be easily fitted in the housing 13.

The operator can set the scintillator 6 in the holder portion 40 only by fitting the press portion 44 in the frame portion 43 while the scintillator 6 is fitted in the frame portion 43. This facilitates the replacement of the scintillator 6.

The mirror holder 9 holds the front surface mirror 7 at a predetermined position. When the front surface mirror 7 is placed at a position overlapping the normal B of the input surface 6a of the scintillator 6, the front surface mirror 7 reflects scintillation light output from the input surface 6a in the normal B direction. The line scan camera 3 installed in the housing 13 detects this scintillation light to implement so-called obverse surface observation type radiation image capturing. In addition, no tilt distortion (perspective distortion) occurs in a radiation image. This prevents the radiation image from blurring.

The inserting direction Da of the scintillator holder 8 with respect to the opening 18 is parallel to the input surface 6a of the scintillator 6. In this case, the scintillator holder is inserted into the opening by horizontal sliding movement of the scintillator. Since it is unnecessary to move the scintillator holder 8 vertically, the scintillator 6 can be easily installed at a desired height.

Since the front surface mirror 7 is positioned outside the irradiation region 12 of radiation, the radiation transmitted through the object A is input to the input surface 6a of the scintillator 6. This eliminates the influence of the front surface mirror 7 on radiation. As a result, the imaging unit 30 can acquire a radiation image of the object A with clarity and high sensitivity.

Figure 10:
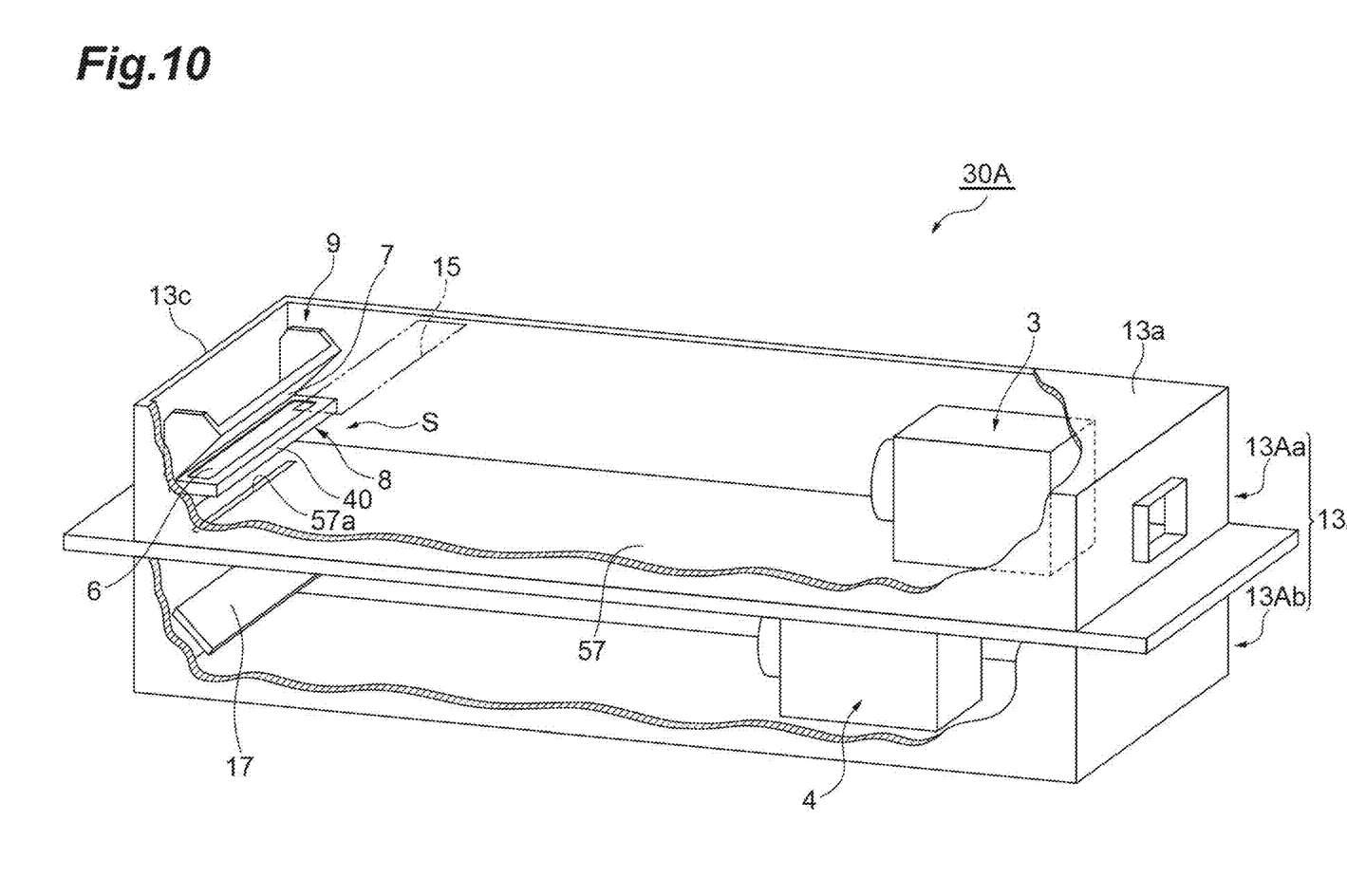
FIG. 10 is a perspective view showing a radiation imaging unit according to the second embodiment, together with a cutaway view of a housing.

Although the embodiments of the present disclosure have been described above, the present invention is not limited to the above embodiments. For example, as shown in FIG. 10, an imaging unit 30A based on the double-sided scintillation detector scheme may be provided as one aspect of the present invention, which includes a housing 13A constituted by a first housing 13Aa and a second housing 13Ab, and has a back surface mirror 17 and a second line scan camera 4 installed in the second housing 13Ab. A partition wall 57 may be provided between the first housing 13Aa and the second housing 13Ab, and an inner surface slit 57a that passes scintillation light output from a reverse surface 6b of the scintillator 6 may be formed in the partition wall 57. The scintillator 6, the front surface mirror 7, and the line scan camera 3 are optically coupled to each other. The scintillator 6, the back surface mirror 17, and the second line scan camera 4 are optically coupled to each other.

As shown in FIG. 9(b), a pair of guide rails 60 may be fixed to the inner surface side of the first side wall portion 13c to guide the holder portion 40 of the scintillator holder 8 in the inserting direction Da and support the holder portion 40 from below. The guide rails 60 allow the scintillator holder 8 to be attached more smoothly, and stabilize the posture of the holder portion 40 to reliably maintain the predetermined angle θ.

In the imaging unit 30 based on the obverse surface observation scheme, the press portion 44 may be closed without the back window portion 44c.

INDUSTRIAL APPLICABILITY

According to several aspects of the present disclosure, a scintillator can be easily replaced by detaching the scintillator holder from the housing.

REFERENCE SIGNS LIST

1 . . . radiation image acquisition system, 2 . . . radiation source, 2a . . . focus, 3 . . . line scan camera, 6 . . . scintillator, 6a . . . input surface (obverse surface), 6b . . . reverse surface, 7 . . . front surface mirror (mirror), 8 . . . scintillator holder, 9 . . . mirror holder, 12 . . . irradiation region, 13, 13A . . . housing, 13a . . . upper wall portion (second wall portion), 13c . . . first side wall portion (wall portion), 15 . . . slit, 15a . . . peripheral edge, 18 . . . opening, 30, 30A . . . imaging unit (radiation imaging unit), 40 . . . holder portion, 41 . . . base portion, 43 . . . frame portion, 43a . . . proximal end, 44 . . . press portion, 50 . . . concave/convex engaging portion, 51 . . . engaging projection, 52 . . . engaging hole, A . . . object, B . . . normal, S . . . attachment structure for scintillator 6, θ . . . angle

The invention claimed is:

1. A scintillator attachment structure in a radiation imaging unit including a housing, a scintillator attached in the housing, and a mirror that is attached in the housing and forms a predetermined angle with respect to the scintillator, the scintillator attachment structure comprising:
an opening formed in a wall portion of the housing; and
a scintillator holder that holds the scintillator and includes a holder portion fitted in the opening, the scintillator holder can be attached to and detached from the housing,
wherein, while the scintillator holder is attached to the housing, the predetermined angle is formed between the scintillator held by the holder portion protruding from the wall portion into the housing and the mirror in the housing.

2. The scintillator attachment structure according to claim 1, wherein the scintillator holder includes a base portion that is contiguous to a proximal end of the holder portion and fixed to the wall portion and can be attached to and detached from the housing by maintaining and releasing a fixed state of the base portion.

3. The scintillator attachment structure according to claim 2, wherein concave/convex engaging portions for positioning the base portion are formed on the wall portion and the base portion.

4. The scintillator attachment structure according to claim 2, wherein the holder portion of the scintillator holder includes a frame portion to which the base portion is contiguous and in which the scintillator is fitted, and
a press portion that is fitted in the frame portion to sandwich the scintillator.

5. The scintillator attachment structure according to claim 1, further comprising a mirror holder that is fixed in the housing and holds the mirror, the mirror holder holding the mirror at a position overlapping a normal of a surface of the scintillator installed in the housing.

6. The scintillator attachment structure according to claim 1, wherein an inserting direction of the scintillator holder with respect to the opening is parallel to a surface of the scintillator.

7. The scintillator attachment structure according to claim 1, wherein a slit for passing radiation is formed in a second wall portion perpendicular to the wall portion of the housing, and
the mirror is positioned outside an irradiation region of radiation which connects a peripheral edge of the slit and a surface of the scintillator installed in the housing.

* * * * *